Sept. 27, 1932.  R. FORNAIRE  1,880,127

SELF PROPELLING VEHICLE

Filed April 14, 1930  5 Sheets-Sheet 1

INVENTOR:
Raphaël Fornaire
BY
ATTORNEY

Sept. 27, 1932.　　　R. FORNAIRE　　　1,880,127
SELF PROPELLING VEHICLE
Filed April 14, 1930　　5 Sheets-Sheet 2

INVENTOR:
Raphaël Fornaire
BY
ATTORNEY

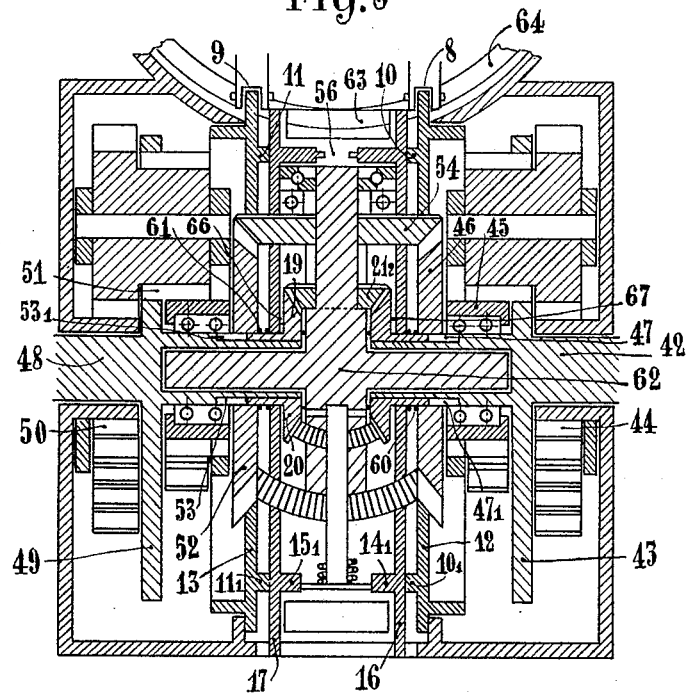

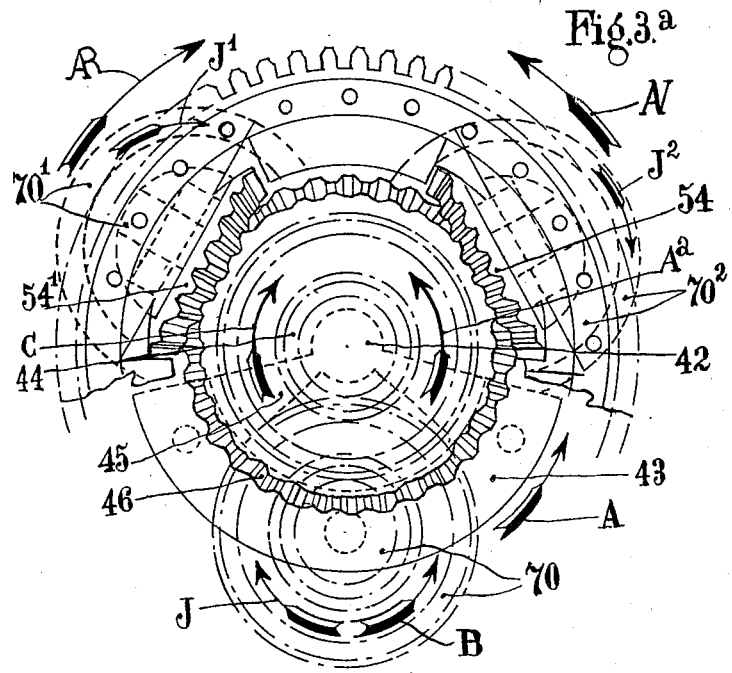
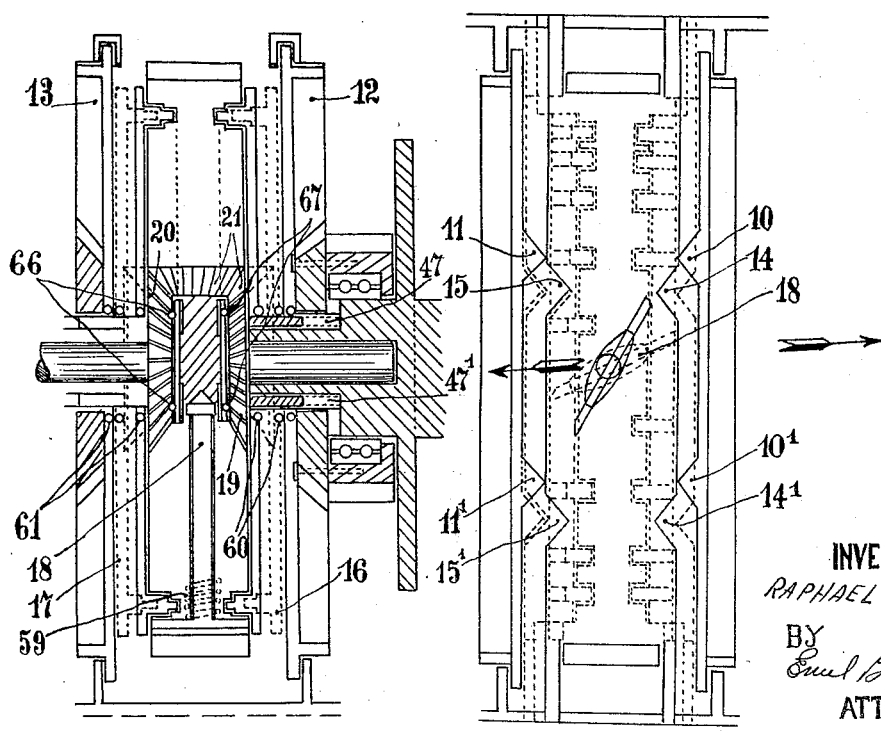

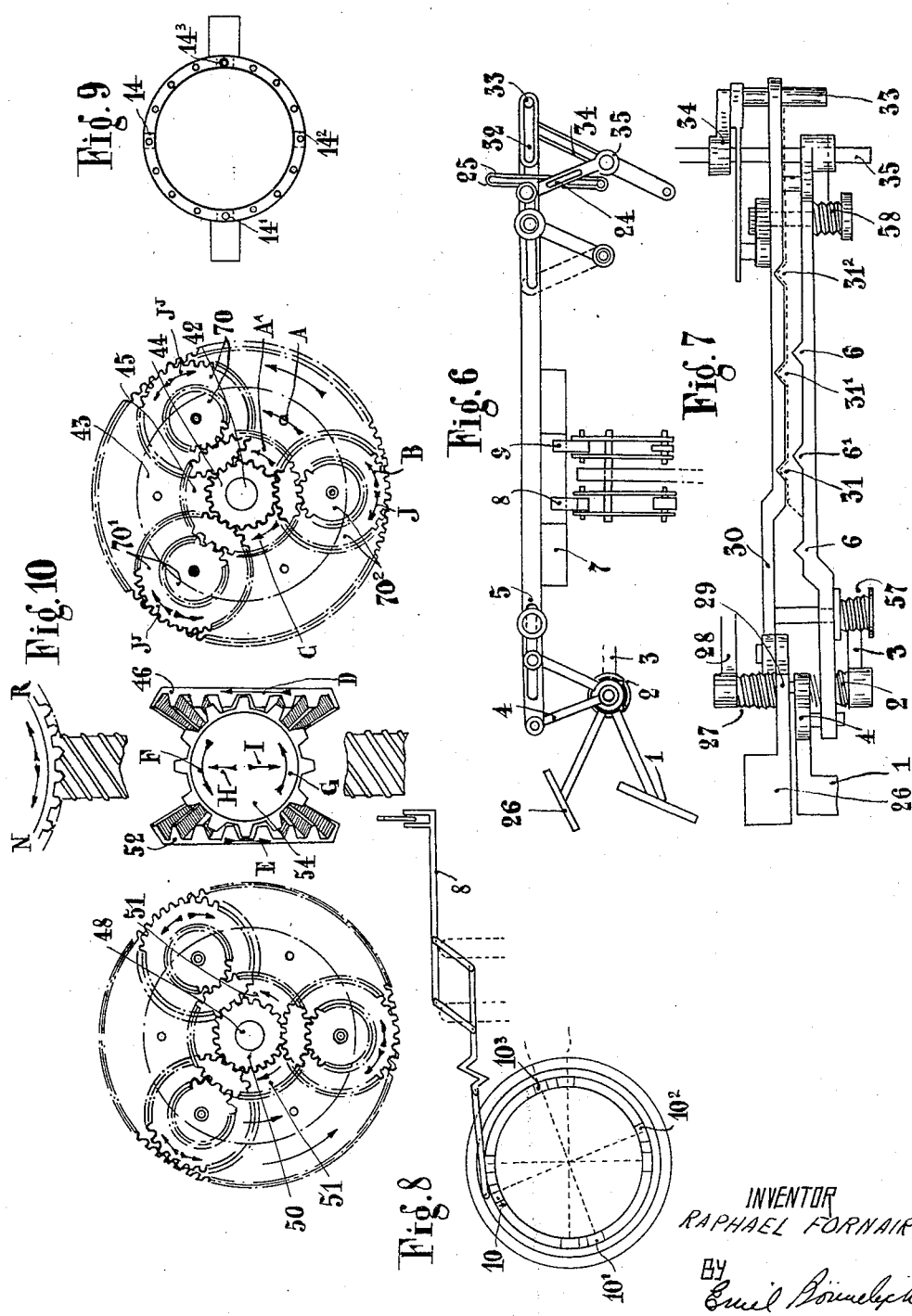

Patented Sept. 27, 1932

1,880,127

UNITED STATES PATENT OFFICE

RAPHAËL FORNAIRE, OF MUROLS, FRANCE

SELF-PROPELLING VEHICLE

Application filed April 14, 1930, Serial No. 444,244, and in France April 18, 1929.

This invention has for its object a universal transmission motor arrangement, that is, a clutchless motor arrangement adapted for direct and reverse operation, providing a wide automatic continuous progressive or degressive speed change range together with an automatic continuous progressive or degressive rational and integral braking effect obtained through the engine. The operation of the whole mechanism is obtained by means of a pair of pedals actuated together or alternatively by one and the same foot.

In conventional motor vehicles, propulsion is obtained by means of an intricate combination of operations performed on a clutch pedal, a throttle pedal, a brake lever, an additional change-speed lever, which operations will produce the desired or normal speed of the vehicle.

Such operations are often accompanied by a slip which results in wear of the clutch and a skidding of the wheels on the ground which results in an abnormal wearing of the tires; in addition, jars and blows will be experienced as a result of a lack of synchronism between the motive effort and the one required for propulsion, whereby even the most skillfully designed mechanisms will deteriorate in a very short time.

Numerous attempts have been made to remedy these drawbacks, particularly by increasing the number of cylinders in internal combustion engines; while, indeed, a greater flexibility is attained in this way at the expense of an increased cost, nevertheless, the problem is left uncompletely solved.

Moreover, present systems leave the problem of braking untouched inasmuch as use is still made of brakes which are apt to get out of order, operate untimely, heat up, wear out, all of which happenings may result in very serious mishaps.

In vehicles provided with the device embodying this invention, a small number of power cylinders and a simple operation will allow the vehicle to be started from rest up to the desired or normal speed without any kind of slip or blow or jar, which ensures a considerably longer life of the mechanism and tires. Whatever the effort imposed upon the engine for tractive purposes may be, it will be transmitted automatically and in a progressive manner. Conversely, bringing the vehicle to rest from normal speed will be obtained under the same conditions without the necessity of levers or brakes of any kind, the latter being retained as emergency devices which will become operative only if the transmission gear should happen to fail. Vehicles equipped with such power gears will have unequalled abilities to run up steep gradients and, which is even better, will afford absolute safety in running down the same as the run will be made at the desired speed without any brake application. Their extreme flexibility will make them particularly fit for the intense circulation in large cities.

A power gear of the kind specified comprises a pair of engines independent from each other, one of which is the main engine while the other is the compensating engine; the latter is at all times under the control of the former and may be of equivalent or less power depending on the applications. The wide difference in the working speeds of the engines is taken advantage of to produce variations in the running speed of the vehicle or in the braking effect on the same.

The whole operation of the system is based on the following:—As long as the working speeds of the engines are the same, the vehicle cannot move; as soon as a difference in the working speeds of the engines appears, the vehicle will be moved. That engine whose working speed is greater enforces its own running direction. The respective and always variable powers of the engines will be added to or subtracted from each other automatically without a loss for a completely synchronous effort.

In the appended drawings:—

Figure 3:
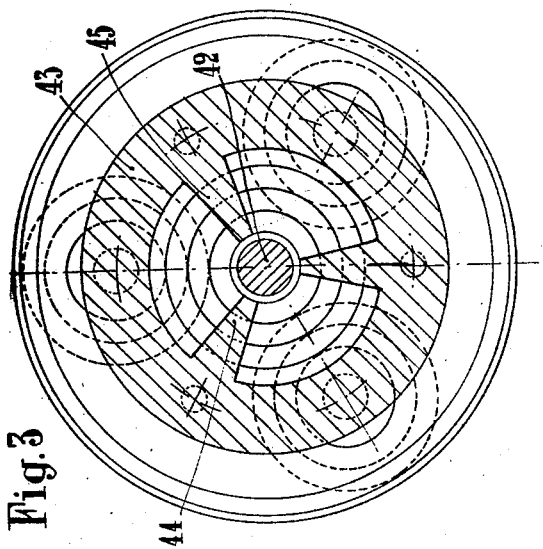
Figure 3 is a vertical cross sectional view taken on line A—A in Fig. 1.

Figure 3$^a$ completes Figure 3 in detail and makes apparent the operation of an epicyclic gear train and of the speed change gear train.

Figure 1:
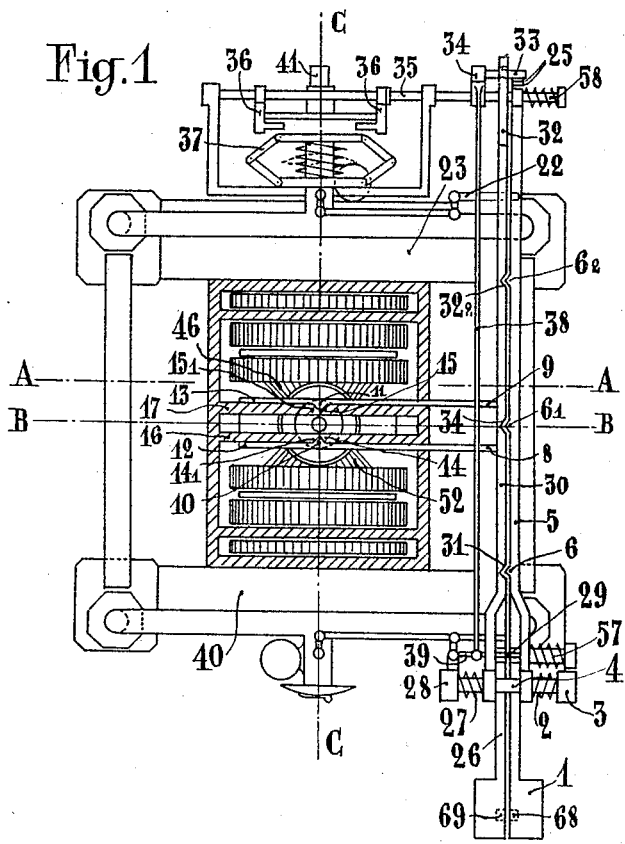
Figure 1 is a more or less diagrammatical general plan view partly in section of a portion displaying the change-speed gear box.
Figure 4:
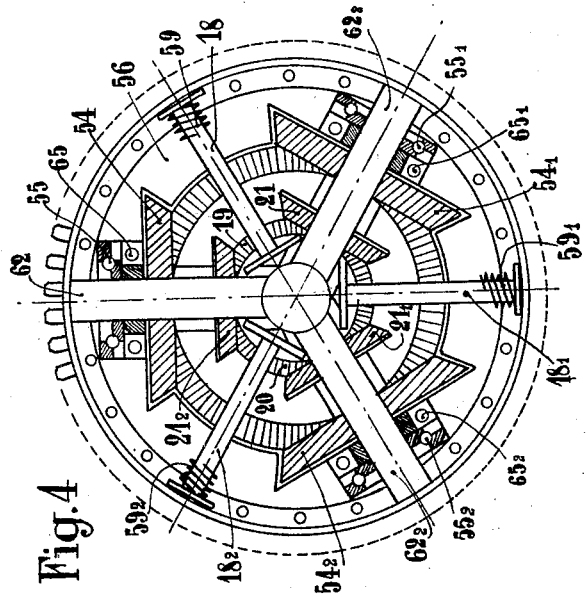

Figure 4 is a vertical cross sectional view taken on line B—B in Fig. 1 in which part of the bevel change-speed planetary train as well as part of the small bevel planetary train arranged co-axially to the same and which serve for the starting of the engines is shown on an enlarged scale.

Figure 5 is a vertical cross sectional view taken on line C—C in Fig. 1 and in which the gear box is shown on a larger scale.

Figure 5$^a$ completes a portion of Figure 5.

Figure 5$^b$ shows a portion of Figure 5, and more particularly the shifting means.

Figure 2:
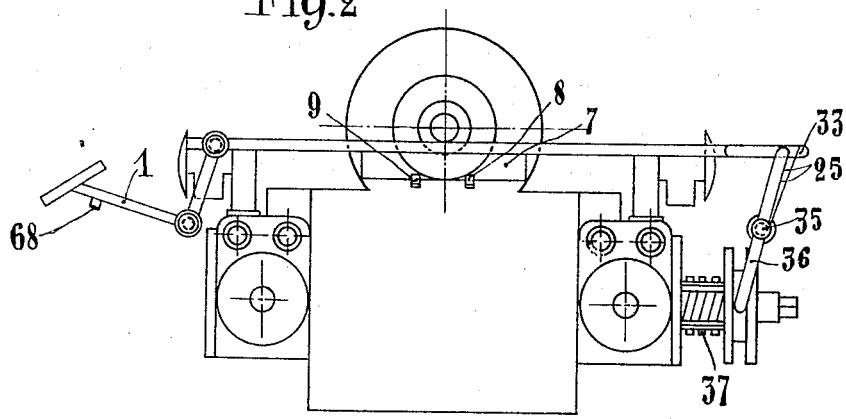
Figure 2 is a longitudinal elevational view.

Figure 6 is a detailed elevation of a portion of Figure 2.

Figure 7 is a detailed plan of a portion of Figure 2.

Figure 8 shows how the elastic connecting rod operates upon the coupling disk.

Figure 9 shows a coupling disk, and,

Figure 10 illustrates the operation of the two epicyclic trains and of the planetary change speed train.

The embodiment illustrated comprises a pedal 1 which is maintained in its raised position by a coil spring 2, abutting against the bearing 3, through the intermediary of the lever 4 which is rigidly connected to the pedal 1. The said pedal controls the bar 5, to which it is connected through the lever 4 (Figures 6 and 7), which bar is formed with V-shaped bosses projecting laterally thereof at equidistant intervals as shown at 6, 6$^1$, 6$^2$, and also with a straight and solid ramp which is adapted to slide in the slots of the elastic links 8 and 9; the function of the said links is to act through the intermediary of the projections 10, 10′, 10$^2$, 10$^3$ and 11, 11′, arranged at equal distances on the peripheral sides of the coupling disks 12 and 13 upon the cuts 14, 14′, 14$^2$, 14$^3$ and 15, 15″, located at equal distances on the peripheral sides of the claw coupling disks 16 and 17.

The coupling disks 12 and 13 act upon the levers for the cams 10, 18′ and 18$^2$ which serve to throw in or out, the small starting planetary train 19, 20 with its planets 21, 21″, 21$^2$. The bar 5 likewise controls the throttle rod 22 for the main engine 23, which is maintained in the position corresponding to the lowermost working speed, and also the lever 24 parallel to lever 4 on which bar 5 rests, and which carries a two-branch or flat V-shaped spring 25.

The pedal 26 is maintained in its raised position by means of the coil spring 27 which is supported against the bearing 28, pedal 26 being connected to the bar 30 by means of lever 29. The said bar is formed in the side thereof with equally spaced V-shaped cuts 31, 31′, 31$^2$ adapted to match the projections 6, 6′, 6$^2$; in addition, the said bar 30 carries at one end thereof a guide 32 adapted to control in one direction only the pin 33, the lever 34, the shaft 35, and the two-armed lever 36 of the centrifugal governor 37; moreover, through the intermediary of the rod 38 connected to the pin 33 and the bell-crank lever 39, the said bar will also control the feed mixture to the engine 40, the position being then the one corresponding to the minimum working speed.

The engines are started by means of the usual hand-operated crank adapted to be fitted on the square end 41, or by any other suitable mechanical means.

The raised position of the pedals thus corresponds to minimum admission and the engines will work in reverse directions at equal rotational speeds. Such working speed is dependent on the setting of the engines, which cannot be absolutely equivalent but which, in fact, is absolutely synchronous inasmuch as the power shafts at that time are interconnected through the small planetary train 19, 20, 21, 21′, 21$^2$.

On one hand, the rotation of the engine 23 through its shaft 42 drives the planet-carrying disk 43 of the epicyclic reduction train whose driving sun wheel 44 is stationary while the driven sun wheel 45 which rotates in the same direction as the power shaft is rigid with the bevel change-speed sun wheel 46 and drives the small bevel sun wheel 19 through the flutes 47, 47″.

On the other hand, the rotation of the engine 40 through its shaft 48 drives the planet-carrying disk 49 of the epicyclic reduction train whose driving sun wheel 50 is stationary while the driven sun wheel 51 which rotates in the same direction as the power shaft is rigid with the bevel change-speed sun wheel 52 and drives the small bevel sun wheel 20 through the flutes 53, 53′.

The bevel sun gears 46 and 52 rotate in reverse directions with equal speeds (the pedals being raised by equal amounts in the position of rest) and cause the planet bevel gears 54, 54′, 54$^2$ to run idle in their respective ball bearings 55, 55′, 55$^2$ housed in the cage or ring 56; it follows that the said ring 56 is stationary, more so as the small sun wheels 19 and 20 and their planets 21, 21′ 21$^2$ for the starting and connection of the engines are meshed, as well as the claw clutches 16 and 17; the vehicle is then stationary.

When the driver desires to start the vehicle forwards, he depresses both pedals 1 and 26 through the same amount to the point where he thinks the effort of the engines will be sufficient to start the vehicle. The pedal 1 through the above mentioned rigging operates the throttling bell-crank lever 22 for the engine 23; the pedal 26 through the two-armed lever 26 and the related members operates the centrifugal governor 37 which it causes to open; the said pedal also operates the throttling rod 38 and bell-crank lever 39 for engine 40. The mixture is fed in equal amounts; the accelerated rotational speeds of the engines are equal; the small planetary train 19, 20, 21', 21² being still in gear, the vehicle is still motionless; however, it is ready for a powerful start when the driver releases the pedal 26, which on being restored to its original position by the spring 27 causes the bar 5 to disengage the bar 30 (which bars were pressed against each other by the coil springs 57 and 58) due to the sliding action of the V-shaped projections 6, 6', 6² on the cuts 31, 31', 31² and that of the ramp 7, pulling the links 8 and 9; the latter disengage the claw disks 16 and 17 and release the cam levers 18, 18', 18² which on being restored by their springs 59', 59², stress springs 60 and 61 respectively and disengage the small sun wheels 19 and 20 from their planet wheels 21, 21', 21², whereby each engine is given its free operation. From this time on, the governor 37 will undertake the control of the rod 38 which control is transferred thereto by the guide 32, on being drawn backwards, the said governor then closing to conform with the working speed of the main engine 23.

The governor 37 throttles down the compensating engine 40 through the rod 38 and, as a result thereof, the engine slows down and reduces by translation the rotational speed of the bevel sun wheel 52. This allows the bevel sun wheel 46 which has a relative speed at high speed of the engine 23, to take a support upon the sun wheel 52, which support will absorb the energy of the compensating engine 40. The planets 54, 54', 54² which drive the spider 62, 62', 62² and the ring or cage 56 rigidly connected to gear wheel 63 meshing with the driven wheel-driving gear wheel 64, are thus imparted a rotational movement about their own axes as well as in the direction of rotation of the sun wheel 46. Such epicyclic rotation, which is proportional to the difference in the speeds of the engines, causes the vehicle to move forward.

The centrifugal governor 37 which at all times is responsive to the changes in the speed of the main engine 23 will cause the compensating engine 40 to intervene whenever a change occurs in the running conditions, such as running uphill or downhill by adding its effort, in the amount required, to that of the engine 23. Such power will rise gradually, tending to approximate that of the main engine 23 and, thereby reducing by a corresponding amount the initial difference by translation of the sun wheel 52, will thus reduce the progression of the vehicle. Conversely, it will increase the speed of progression of the vehicle by reducing the complementary power of the compensating engine 40 which, by having its speed gradually lowered by translation, will set up a progressive difference in the speeds of the sun wheels 46 and 52, the result of which is an increase in the running speed.

If it is desired to slow down the speed of the vehicle, the driver progressively raises the pedal 1 which through the associated members will gradually throttle the engine 23.

If it is desired to stop the vehicle, the pedal 1 is allowed to rise up to the limit of its travel, whereby the feed mixture to the engine 23 is cut off. Through the lever 24, the two-armed spring 25 which is stronger than the spring 65 of the governor pushes the pin 33 connected to the rod 38, the lever 34, and through the shaft 35 the two-armed lever 36 will cut off the feed to the compensating engine 40. The projections 6, 6', 6² and the cuts 31, 31', 31² are pushed into engagement by the springs 57 and 58 and the links 8 and 9 through their associated members throw in the claw coupling; likewise, the cams 18, 18', 18² by rotating through a definite amount have allowed the springs 60 and 61 to throw the sun wheels 19 and 20 into engagement with their planets 21, 21', 21². The vehicle is stopped.

Backward running is obtained by depressing both pedals 1 and 26 until the starting effort is secured. Thereafter, the pedal 1 is released and the same, through its operating members, on one hand, will operate the claw coupling and throw the small starting sun wheel out of gear and on the other hand will decrease the speed of the engine 23 by translation of the sun wheel 46 which acts as a support, thus allowing the sun wheel 52 to drive the planets 54, 54', 54² into the same circular rotation as the sun wheel 52, that is the backward running direction of rotation.

In backward running operation, both pedals 1 and 26 being lowered, pedal 1 is limited in its releasing travel by a stop 68 of its own and which after a definite travel is retained by the adjustable pin 69 secured to the pedal 26; furthermore, the two-armed spring 25 by lending itself to the greater power of the coil spring 2 acts as a cushion to offset the antagonistic effects of the governor 37 which the pedal 1 seeks to close and which is opened by the pedal 26 in order that the feed to the engine 40 may be greater than that to the engine 23.

In order to stop the vehicle anew the pedals 26 and 1 are released and the same through their associated members will cut off the feeds to the related engines and throw again the claw couplings and the small starting sun wheel into engagement.

It will be apparent from the above disclosure that accelerating the vehicle from rest to normal running speed, decelerating stopping, starting the vehicle backwards and stopping it again, can all be obtained by the operation of two pedals only.

It should now be noted that:—

(a) the bevel planet wheels 54, 54', 54² are provided with free wheel devices 65, 65', 65² respectively which will allow them to rotate in one direction only, in order to allow the irreversibility necessary for the operation of the system to be secured;

(b) a pair of ball thrust bearings are arranged between the cams 18, 18', 18² and the small sun wheels 19 and 20 respectively.

I claim:

1. A self-propelling vehicle provided with a universal transmission gear which comprises in combination a main engine and a compensating engine independent from each other and rotating in reverse directions; a centrifugal governor providing for an automatic speed change of each engine; a twin epicyclic train transmission gear connected to the drive shafts of the engines, the driving sun wheels of the transmission gear being stationary while the driven sun wheels are movable and adapted to rotate in the same direction; a change-speed gear consisting of a bevel planetary train each sun wheel of which rotates in reverse direction to the other and becomes responsive to the engines to which it is connected by suitable shifting members; and planet wheels adapted to either run idle in bevel ball bearings when the rotational speeds of the planetary gears are equal or rotate about their own axes and progress circularly through a gradual and continually progressive quantity, the planetary gears in their rotations being differentially responsive to the engines the rotational speeds of which are progressively or degressively variable.

2. A driving mechanism comprising a source of motive power, another source of motive power, a triple differential system connected to both sources, means for applying the differential speed of both sources to a driven member, and means carried by the differential system for ensuring irreversibility of its motion when the differential speed is in any one direction.

3. A driving mechanism comprising a motive shaft, a second motive shaft, means for applying the difference in speed of the two shafts to move a vehicle, and automatic means for neutralizing the momentum of the vehicle when it is traveling in any one direction, said means comprising a triple differential system connected to both motive shafts.

4. A driving mechanism comprising a driving shaft, a second driving shaft, means for applying the difference in speed of the two shafts to propel a vehicle, and means for varying the difference in speed of the two shafts, said last-mentioned means comprising a plurality of planetary gear trains mounted in differential relation to the driving shafts, and means for automatically maintaining the gear trains in relative motion to neutralize the momentum of the vehicle, said gear trains including a fixed sun wheel and double-geared satellite pinions.

In testimony whereof, I affix my signature.

RAPHAËL FORNAIRE.